(12) United States Patent
Pohl et al.

(10) Patent No.: US 7,538,154 B2
(45) Date of Patent: *May 26, 2009

(54) AQUEOUS FOAM COATING WITH SOFT-FEEL EFFECT

(75) Inventors: Torsten Pohl, Leverkusen (DE); Uwe Klippert, Burscheid (DE); Thomas Münzmay, Dormagen (DE); Frank Kobor, Shanghai (CN)

(73) Assignee: Bayer MaterialScience AG, Leverkusen (DE)

( * ) Notice: Subject to any disclaimer, the term of this patent is extended or adjusted under 35 U.S.C. 154(b) by 140 days.

This patent is subject to a terminal disclaimer.

(21) Appl. No.: 11/244,984

(22) Filed: Oct. 6, 2005

(65) Prior Publication Data

US 2006/0079635 A1   Apr. 13, 2006

(30) Foreign Application Priority Data

Oct. 12, 2004   (DE) .................. 10 2004 049 591

(51) Int. Cl.
  B05D 3/02 (2006.01)
  B32B 27/00 (2006.01)
  B32B 27/40 (2006.01)
  C08G 18/00 (2006.01)
  C08J 3/00 (2006.01)
  C08K 3/20 (2006.01)
  C08L 75/00 (2006.01)

(52) U.S. Cl. .......... 524/591; 427/372.2; 427/385.5; 428/423.1; 521/67; 521/155; 521/157; 521/159; 521/174; 524/589; 524/590; 524/839; 524/840

(58) Field of Classification Search .......... 524/589, 524/590, 591, 839, 840; 427/372.2, 385.5; 428/423.1; 521/67, 155, 157, 159, 170, 172, 521/174

See application file for complete search history.

(56) References Cited

U.S. PATENT DOCUMENTS

| | | | |
|---|---|---|---|
| 4,237,264 A | 12/1980 | Noll et al. | 528/67 |
| 5,284,928 A | 2/1994 | Münzmay et al. | 528/52 |
| 5,569,707 A | 10/1996 | Blum et al. | 524/591 |
| 6,303,665 B1 | 10/2001 | Helber et al. | 521/65 |
| 6,642,303 B2 | 11/2003 | Schütze et al. | 524/589 |
| 6,762,243 B2 | 7/2004 | Stender et al. | 524/590 |
| 2002/0123562 A1 | 9/2002 | Stender et al. | 524/589 |
| 2003/0105219 A1 | 6/2003 | Schutze et al. | 524/589 |
| 2003/0191207 A1 | 10/2003 | Dejima et al. | 521/155 |
| 2004/0242765 A1* | 12/2004 | Munzmay et al. | 524/589 |

FOREIGN PATENT DOCUMENTS

DE   1 595 636   8/1969

* cited by examiner

*Primary Examiner*—Patrick D Niland
(74) *Attorney, Agent, or Firm*—Noland J. Cheung; Robert S. Klemz

(57) ABSTRACT

The invention provides aqueous preparations having soft-feel properties, foams obtainable by mechanically foaming these preparations, and soft-feel coatings based on the foams. The preparations comprise aqueous polyurethane-polyurea dispersions, hydroxy-functional, aqueous or water-dilutable binders, polyisocyanates which may have been hydrophilically modified, and foam stabilizers.

12 Claims, No Drawings

AQUEOUS FOAM COATING WITH SOFT-FEEL EFFECT

CROSS-REFERENCE TO RELATED APPLICATION

This application claims priority to German Application DE 10 2004 049 591.2, filed Oct. 12, 2004.

FIELD OF THE INVENTION

The invention relates to new aqueous preparations having soft-feel properties, to foams obtainable by mechanically foaming these preparations, and to soft-feel coatings based on the foams.

BACKGROUND OF THE INVENTION

Efforts to achieve a weight saving in the car have for years gone hand in hand with the increased deployment of plastic, not least in the interior. Aesthetic and technical requirements mean that plastic parts in the car are usually painted, in order to protect the plastic against external influences, such as sunlight and chemical, thermal and mechanical stress, to obtain particular colours and colour effects, to mask defects in the plastic's surface or to give the latter a pleasant feel (tactility). In order to improve the tactile properties of plastic parts in the car interior, recent years have seen increasing use of what are called soft-feel paints. A "soft-feel" effect for the purposes of the present invention refers to a particular tactual sensation (tactility) on the part of the painted surface. This tactility can be described using terms such as velvety, soft, rubbery or warm, whereas, for example, the surface of a painted car body or a plastic plate such as ABS, Makrolon® (polycarbonate, Bayer AG) or plexiglass, for example, which is unpainted or has been painted with a conventional clearcoat or topcoat, feels cold and smooth. In tune with the trend towards avoiding solvent emissions to the environment, aqueous soft-feel paints based on polyurethane chemistry, as disclosed by way of example in DE-A 44 06 159, have become established over recent years. As well as an excellent soft-feel effect, these paints also produce coatings possessing good resistance and a protective effect for the plastic substrate.

In the meantime the comfort requirements in the car interior have risen further, and so the desired soft-feel effect cannot always be achieved by means of comparatively thin-film coatings alone. A substantially better comfort is offered, for example, by gel coatings as described for example in DE-A 100 37 157. The production of such coatings, however, is complicated and therefore costly, as a result of their multilayer construction.

DE-A 22 64 853 and DE-A 42 30 997 disclose how, starting from aqueous polyurethane-polyurea dispersions, smooth coatings can be obtained by the production of a frothed foam and the coating of substrates to form fine-pored, smooth coatings. A disadvantage of these systems, however, is that the foam coatings thus obtainable are not sufficiently stable to common solvents.

According to the teaching of DE-A 22 64 853 and of DE-A 42 30 997 the resistance to solvents and chemicals can be raised by the addition of so-called crosslinkers; it has emerged, however, that, because of the lack of reactive groups in the polyurethane-polyurea, this crosslinking leads only to a limited improvement in resistance and is not sufficient for service, for example, in the car interior without an additional topcoat/finish.

SUMMARY OF THE INVENTION

Surprisingly it has now been found that specific, aqueous preparations obtainable by mechanical foaming (frothed foam) are suitable for producing foamed coatings which on the one hand produce an outstanding tactility (soft-feel effect) and on the other hand are distinguished by better scratch resistance and solvent resistance, even without an additional topcoat/finish, as compared with unfoamed coatings.

The present invention provides aqueous preparations having soft-feel properties and comprising
- A) aqueous polyurethane-polyurea dispersions,
- B) hydroxy-functional, aqueous or water-dilutable binders,
- C) polyisocyanates, which may have been hydrophilically modified, and
- D) foam stabilizers.

Also provided are methods of producing the soft-feel foam and coatings based thereon.

DETAILED DESCRIPTION OF PREFERRED EMBODIMENTS

As used herein, as used in the examples or unless otherwise expressly specified, all numbers may be read as if prefaced by the word "about", even if the term does not expressly appear. Also, any numerical range recited herein is intended to include all sub-ranges subsumed therein.

Aqueous polyurethane-polyurea dispersions suitable as component A) are described for example in D. Dieterich in Houben-Weyl—Methoden der Organischen Chemie Volume E20: Polyurethane, pp. 1662-1666, pp. 1667-1670, 1672-1680, and also for example in DE-A 15 95 636, DE-A 26 51 506, DE-A 41 33 572 or WO-A 02/090413.

Component A) comprises units selected from the following groups:
- a1) polyester, polyesteramide, polycarbonate, polyacetal and polyether polyols having molecular weights of at least 300, preferably 500 to 8000, more preferably 800 to 5000, which contain at least two free hydroxyl groups and are capable of reaction with isocyanate groups,
- a2) diols of the molecular weight range 62 to 299,
- a3) nonionic hydrophilicizer based on a copolymer of ethylene oxide and propylene oxide,
- a4) di- or polyisocyanates,
- a5) aliphatic and/or alicyclic primary and/or secondary polyamines,
- a6) isocyanate-reactive, ionically or potentially ionically hydrophilicizing compounds.

Suitable polyol components a1) include in particular linear polyester diols or else polyester polyols with a low degree of branching, such as may be prepared conventionally from aliphatic, cycloaliphatic and aromatic di- or polycarboxylic acids and/or their anhydrides. Preferred units are, for example, adipic, decanedicarboxylic, terephthalic, isophthalic, o-phthalic, tetrahydrophthalic, hexahydrophthalic and acid anhydrides, such as o-phthalic anhydride or a mixture thereof, and polyhydric alcohols, such as ethanediol, di-, tri-, tetraethylene glycol, 1,2-propanediol, di-, tri-, tetrapropylene glycol, butane-1,4-diol, hexane-1,6-diol, 2,2-dimethyl-1,3-propanediol, 1,4-dimethylolcyclohexane or mixtures thereof, with or without the use of polyols of higher functionality, such as trimethylolpropane or glycerol. Suitable polyhydric alcohols for preparing the polyester polyols a1) naturally also include cycloaliphatic and/or aromatic di- and polyhydroxyl compounds. In lieu of the free polycarboxylic acid it is also possible to use the corresponding polycarboxylic anhydrides or corresponding polycarboxylic esters of lower alcohols or mixtures thereof for preparing the polyesters a1).

Suitable polyol components also include homopolymers or copolymers of lactones, which are obtained preferably by addition reaction of lactones or lactone mixtures, such as butyrolactone, s-caprolactone and/or methyl-ε-caprolactone, with suitable difunctional and/or higher polyfunctional starter molecules, such as low molecular weight polyhydric alcohols, for example. Preference is given to a copolymer of hexane-1,6-diol, ε-caprolactone with diphenyl and/or dialkyl carbonates.

Hydroxyl-containing polycarbonates are also suitable as polyol components a1), examples being those which can be prepared by reacting diols such as 1,4-butanediol and/or 1,6-hexanediol with diaryl carbonates, e.g. diphenyl carbonate, dialkyl carbonate, such as dimethyl carbonate, or phosgene, with a molecular weight of 800 to 5000.

Suitable polyol components a1) are, furthermore, polyether polyols such as polytetramethylene glycols, for example, which are used preferably in combination with the polycarbonate polyols.

Optionally it is also possible to use diols of the molecular weight range 62 to 299 as units, although this is not preferred. Preferred synthesis components a2) are 1,2-ethanediol, 1,4-butanediol, 1,6-hexanediol and 2,2-dimethylpropane-1,3-diol. 1,4-Butanediol and 1,6-hexanediol are particularly preferred.

It is optionally possible for component A) to have a nonionic hydrophilicization. For that purpose it is preferred as synthesis components a3) to use the copolymers of ethylene oxide with propylene oxide that have an ethylene oxide mass fraction of more than 50%, with particular preference of 55% to 89%.

The monofunctional hydrophilic synthesis components are prepared in a similar way to that described in DE-A 23 14 512 or DE-A 23 14 513 or in U.S. Pat. No. 3,905,929 or U.S. Pat. No. 3,920,598, by alkoxylating a monofunctional starter such as n-butanol or N-methylbutylamine, for example, using ethylene oxide and optionally a further alkylene oxide such as propylene oxide, for example.

In one particularly preferred embodiment use is made as synthesis components a3) of compounds having a molecular weight of at least 400 daltons, preferably of at least 500 daltons and more preferably of 1200 to 4500 daltons.

Suitable synthesis components a4) for the aqueous polyurethane-polyurea dispersions that are preferred as component A) include any desired organic compounds which have at least two free isocyanate groups per molecule, such as diisocyanates $X(NCO)_2$, for example, where X is a divalent aliphatic hydrocarbon radical having 4 to 12 carbon atoms, a divalent cycloaliphatic hydrocarbon radical having 6 to 15 carbon atoms, a divalent aromatic hydrocarbon radical having 6 to 15 carbon atoms or a divalent araliphatic hydrocarbon radical having 7 to 15 carbon atoms. Further examples of compounds which can be used as a diisocyanate component are described for example by W. Siefken in Justus Liebigs Annalen der Chemie, 562, pp. 75-136.

Examples of diisocyanates to be used with preference are 1,6-diisocyanatohexane (HDI), 1-isocyanato-3,3,5-trimethyl-5-isocyanatomethylcyclohexane (isophorone diisocyanate, IPDI), 4,4'-diisocyanatodicyclohexylmethane, 1-isocyanato-1-methyl-4(3)isocyanatomethylcyclohexane, 1,3- and 1,4-bis(2-isocyanatoprop-2-yl)benzene (TMXDI) or any desired mixtures of such diisocyanates.

It will be appreciated that it is also possible (additionally) to use, proportionally, the polyisocyanates of higher functionality that are known per se in polyurethane chemistry or else modified polyisocyanates that are known per se, containing for example carbodiimide groups, allophanate groups, isocyanurate groups, urethane groups and/or biuret groups.

Examples of preferred synthesis components a5) include 1,2-ethanediamine, 1-amino-3,3,5-trimethyl-5-aminomethylcyclohexane (isophoronediamine), piperazine or diethylenetriamine and also hydrazine or hydrazine hydrate.

Based on solids, the aqueous polyurethane-polyurea dispersions A) have an anionic groups content of 1 to 30, preferably of 1 to 20, more preferably of 2 to 13.5 mmol per 100 g of polyurethane-polyurea resin. Ionic groups of this kind are successfully incorporated conventionally through the additional use of synthesis components a6), which in addition to at least one, preferably two isocyanate-reactive groups such as alcohol or amine functions, for example, contain an anionic or potentially anionic group. Examples of suitable synthesis components a6) are dihydroxyalkanecarboxylic acids such as dimethylolpropanoic acid or dimethylolbutyric acid, and also diols which additionally contain 0.5 to 2 mol of sulphonic acid groups or sulphonate groups per molecule, such as polyethersulphonates, for example.

Preferred compounds a6) are, moreover, diamines or polyamines containing, for example, alkali metal sulphonate groups, particular preference being given to the alkali metal salts of N-(2-aminoethyl)-2-aminoethanesulphonic acid. The sodium salt is preferred.

Where synthesis component a6) is used in the form of free acids, these acids must be converted into their ionic form by adding suitable neutralizing agents before the polymer melt is transferred to water. Examples of suitable neutralizing agents include tertiary amines or inorganic bases; the counterion is the sodium ion.

It is usual to use 20% to 94.5%, preferably 30% to 80% and more preferably 50% to 76.5% by weight of component a1), 0 to 30%, preferably 0 to 15% by weight of component a2), 0 to 10%, preferably 0.5% to 6% by weight of component a3), 4.5% to 50%, preferably 5% to 30% and more preferably 7.5% to 20% by weight of component a4), 0.5% to 13%, preferably 1% to 5% by weight of component a5) and 0.5% to 8%, preferably 1.5% to 5.5% by weight of component a6), with the proviso that the sum of the components makes 100% by weight.

The aqueous polyurethane-polyurea dispersion that is suitable as synthesis components A) is prepared preferably by the acetone process (D. Dieterich in Houben-Weyl: Methoden der Organischen Chemie, Volume E20, pp. 1670-81 (1987)).

In the acetone process the synthesis of the polyurethane-polyurea resins forming the basis in the aqueous dispersions A) takes place in a multi-stage operation.

In a first stage a prepolymer containing isocyanate groups is synthesized from the synthesis components a1) to a4) and optionally a6). The amounts in which the individual components are employed are such as to result in an isocyanate index of 1.1 to 3.5, preferably of 1.3 to 2. The isocyanate content of the prepolymers is between 1.5% and 7.5%, preferably between 2% and 4.5% and more preferably between 2.5% and 3.5%. Furthermore, when determining the amount of the synthesis components a1) to a4) and optionally a6), it should be ensured that the arithmetic, number-average functionality lies between 1.80 and 3.50, preferably between 1.95 and 2.25.

In a second stage the prepolymer prepared in stage 1 is dissolved in an organic, at least partly water-miscible solvent which carries no isocyanate-reactive groups. A preferred solvent is acetone. The amounts of solvent to be used should be such as to result in a solids content of 20% to 80%, preferably of 30% to 50%, more preferably of 35% to 45% by weight.

In a third stage the isocyanate-containing prepolymer solution is reacted with mixtures of the amino-functional synthesis components a5) and a6), insofar as the synthesis components a6) are amino-functional compounds, with chain extension to form the high molecular weight polyurethane-polyurea resin. The amounts of the synthesis components are such that for each mole of isocyanate groups of the dissolved prepolymer there results 0.3 to 0.93 mol, preferably 0.5 to 0.85 mol, of primary and/or secondary amino groups of the synthesis components a5) to a6). The arithmetic, number-average isocyanate functionality of the resultant polyurethane-polyurea resin amounts to between 1.55 and 3.10, preferably between 1.90 and 2.35. The arithmetic, number-average molecular weight (Mn) amounts to between 4500 and 250 000, preferably between 10 000 and 80 000 daltons.

In a fourth stage the high molecular weight polyurethane-polyurea resin is precipitated in the form of a fine dispersion by addition of water to the solution.

Free acid groups incorporated are optionally neutralized between the third and fourth steps.

In a fifth stage some or all of the organic solvent is distilled off, optionally under reduced pressure. The amount of water in stage 4 is determined such that the aqueous polyurethane-polyurea dispersion has a solids of 30% to 70%, preferably of 40% to 65% by weight.

Suitable components B) include any desired hydroxy-functional, aqueous or water-dilutable, ionomeric binders from the classes of the polyester, polyurethane, polyurea-polyurethane and polyacrylate resins and/or any desired combinations of the aforementioned types such as polyurethane-polyacrylate or polyester-polyacrylate graft polymers, for example. Preferred components B) are aqueous or water-dilutable preparations of hydroxy-functional polyester-polyurethane resins (e.g. DE-A 44 06 159 or DE-A 41 37 429). The term "polyester-polyurethanes" used below for component B) embraces, for the purposes of the invention, all polyurethanes which contain as a soft segment one or more of the polyhydroxyl compounds specified as synthesis components b1), especially polyester polyols, polycaprolactone polyols and polycarbonate polyols, and also mixtures of said polyhydroxyl compounds.

Highly suitable components B) are aqueous or water-dilutable preparations of hydroxy-functional ionomeric binders prepared from the following synthesis components:

b1) at least one hydroxy-functional polyester polyol, polycarbonate polyol or polycaprolactone polyol or mixtures thereof, with a number-average molecular weight Mn of 400 to 6000, b2) optionally low molecular weight compound containing two or more hydroxyl and/or amino groups, with a molecular weight $M_n$ of 62 to 400, b3) at least one compound which contains at least two groups that are reactive towards isocyanate groups and at least one group that is capable of forming anions, and b4) polyisocyanates.

The aqueous or water-dilutable preparations of hydroxy-functional polyester-polyurethane resins that are preferred as component B) can be prepared by the conventional processes known in the prior art. They contain carboxylic acid and/or sulphonic acid groups, preferably carboxylic acid groups, at least a proportion of which may have been neutralized, as hydrophilic groups.

Polyester polyols which can be used as synthesis component b1) preferably have a molecular weight Mn of 600 to 3000. Their hydroxyl number is 22 to 400, preferably 50 to 200 and more preferably 80 to 160 mg KOH/g. They have a hydroxyl functionality of 1.5 to 6, preferably of 1.8 to 3 and more preferably of 2.

Highly suitable examples are the known polycondensates of di- and also optionally poly-(tri-, tetra-)ols and di- and also optionally poly-(tri-, tetra-)-carboxylic acids or hydroxy carboxylic acids or lactones. In lieu of the free polycarboxylic acids it is also possible to use the corresponding polycarboxylic anhydrides or corresponding polycarboxylic esters of lower alcohols for preparing the polyesters. Examples of suitable diols are, for example, ethanediol, di-, tri-, tetraethylene glycol, 1,2-propanediol, di-, tri-, tetrapropylene glycol, butane-1,4-diol, hexane-1,6-diol, 2,2-dimethyl-1,3-propanediol, 1,4-dimethylolcyclohexane or mixtures thereof, optionally with the additional use of polyols of higher functionality, such as trimethylolpropane, glycerol, or pentaerythritol.

Examples of suitable dicarboxylic acids include the following: phthalic acid, isophthalic acid, terephthalic acid, tetrahydrophthalic acid, hexahydrophthalic acid, cyclohexanedicarboxylic acid, adipic acid, glutaric acid, maleic acid or fumaric acid. Anhydrides of these acids are likewise suitable where they exist. For the purposes of the present invention, therefore, the anhydrides are encompassed by the expression "acid". It is also possible to use monocarboxylic acids, such as benzoic acid and hexanecarboxylic acid, proportionally, provided that the average functionality of the polyol is higher than 2. Saturated aliphatic or aromatic acids are preferred, such as adipic acid or isophthalic acid. As a polycarboxylic acid for optional additional use in relatively small amounts, mention may be made here of trimellitic acid.

Hydroxy carboxylic acids which can be used as reaction participants in the preparation of a polyester polyol with terminal hydroxyl are, for example, hydroxycaproic acid, hydroxybutyric acid, hydroxydecanoic acid, hydroxystearic acid and the like. Suitable lactones are ε-caprolactone or γ-butyrolactone.

Compounds of synthesis component b1) may at least proportionally also contain primary or secondary amino groups as isocyanate-reactive groups.

Suitable synthesis components b1) further include hydroxyl-containing polycarbonates having a preferred molecular weight Mn of 600 to 3000, which are obtainable for example by reacting carbonic acid derivatives, e.g. diphenyl carbonate, dimethyl carbonate and phosgene, with polyols, preferably diols. Suitable such diols include preferably 1,4-butanediol, 1,6-hexanediol, 1,8-octanediol, 2,2-dimethyl-1,3-propanediol, 1,4-bishydroxymethylcyclohexane, bisphenol A or else lactone-modified diols. Preferably the diol component contains 40% to 100% by weight of 1,6-hexanediol or 1,4-butanediol, more preferably 1,6-hexanediol and/or 1,6-hexanediol derivatives, preferably those which besides terminal hydroxyl groups contain ether groups or ester groups, examples being products obtained by reacting 1 mol of 1,6-hexanediol with at least 1 mol, preferably 1 to 2 mol, of caprolactone or by etherifying hexanediol with itself to give the di- or trihexylene glycol. The hydroxyl polycarbonates ought to be substantially linear. However, as a result of the incorporation of polyfunctional components, especially low molecular weight polyols, they may optionally be slightly branched. Examples of compounds suitable for this purpose include glycerol, trimethylolpropane, hexane-1,2,6-triol, butane-1,2,4-triol, trimethylolpropane, pentaerythritol, quinitol, mannitol, sorbitol, methyl glycoside or 1,3,4,6-dianhydrohexitols.

The synthesis component b2) preferably has a molecular weight of 62 to 200. It may contain aliphatic, alicyclic or aromatic groups. By way of example mention may be made here of the low molecular weight polyols having up to about 20 carbon atoms per molecule, such as, for example, ethylene glycol, diethylene glycol, triethylene glycol, 1,2-propanediol, 1,3-propanediol, 1,4-butanediol, 1,3-butylene glycol, cyclohexanediol, 1,4-cyclohexanedimethanol, 1,6-hexanediol, hydroquinone dihydroxyethyl ether, bisphenol A (2,2-bis(4-hydroxyphenyl)propane), hydrogenated bisphenol A (2,2-bis(4-hydroxycyclohexyl)propane) and also mixtures thereof, and also trimethylolpropane, glycerol or pentaerythritol. Ester diols as well, such as δ-hydroxybutyl-ε-hydroxycaproic ester, ω-hydroxyhexyl-γ-hydroxybutyric ester, adipic acid β-hydroxyethyl ester or terephthalic acid bis(β-hydroxyethyl) ester, for example, can be used. Di- or polyamines and also hydrazides can likewise be used as b2), examples being ethylenediamine, 1,2- and 1,3-diaminopropane, 1,4-diaminobutane, 1,6-diaminohexane, isophoronediamine, isomer mixture of 2,2,4- and 2,4,4-trimethylhexamethylenediamine, 2-methylpentamethylenediamine, diethylenetriamine, 1,3- and 1,4-xylylenediamine, α,α,α',α'-tetramethyl-1,3- and -1,4-xylylenediamine and 4,4-diaminodicyclohexylmethane, dimethylethylenediamine, hydrazine or adipic dihydrazide.

Compounds suitable as synthesis component b3) include, besides the compounds already mentioned under a6), monohydroxy carboxylic acids such as hydroxyl-pivalic acid, for example. Preferred ionic or potential ionic compounds b4) are those which possess carboxyl and/or carboxylate groups. Particularly preferred ionic or potentially ionic compounds b4) are dihydroxy carboxylic acids, especially 2,2-dimethylolacetic acid, 2,2-dimethylolpropionic acid, 2,2-dimethylolbutyric acid, 2,2-dimethylolpentanoic acid or dihydroxysuccinic acid.

The compounds which come under synthesis components b1) to b3) may also contain C=C double bonds, which may originate, for example, from long-chain aliphatic carboxylic acids or fatty alcohols. Functionalization with olefinic double bonds is also possible, for example, through the incorporation of allylic groups or of acrylic acid or methacrylic acid and also their respective esters.

Suitable as polyisocyanates suitable as synthesis component b4) are the compounds already mentioned under a4). The compounds involved are preferably polyisocyanates or polyisocyanate mixtures of the stated type, containing exclusively aliphatically and/or cycloaliphatically attached isocyanate groups. Especially preferred starting components b4) are polyisocyanates and/or polyisocyanate mixtures based on HDI, IPDI and/or 4,4'-diisocyanatodicyclohexylmethane.

The water-dilutable polyester-polyurethanes B) are prepared by methods which are known in principle. They can be prepared, for example, by first preparing an isocyanate-functional prepolymer from b4) and one or more compounds b1) to b3) and in a second reaction step, by reaction with one of the compounds b1) to b3), usually b2), in a non-aqueous medium, obtaining a hydroxyl-functional polyester-polyurethane resin, as described for example in EP-A 0 355 682, p. 4, ll. 39-45.

Preferably, however, preparation takes place such that the hydroxy-functional polyester-polyurethane resin containing OH and/or NH groups is formed directly by reaction of components b1) to b4) in a non-aqueous medium, as described for example in EP-A 0 427 028, p. 4, 1.54-p. 5, 1.1.

The urethanization reaction can be carried out in the presence of solvents which are inactive with respect to isocyanates. The amount of this solvent advantageously does not exceed 30% by weight and is preferably in the range from 0 to 20% by weight, based in each case on the sum of hydroxyfunctional polyurethane resin and solvent.

The acid groups incorporated in the hydroxy-functional polyester-polyurethane resin B) via synthesis component b3) may at least proportionally be neutralized. Particularly suitable for the neutralization are tertiary amines, examples being trialkylamines having 1 to 12, preferably 1 to 6, carbon atoms in each alkyl radical. Examples thereof are trimethylamine, triethylamine, methyldiethylamine, tripropylamine and diisopropylethylamine. The alkyl radicals may, for example, also carry hydroxyl groups, such as in the case of the dialkylmonoalkanol-, alkyldialkanol- and trialkanolamines. An example thereof is dimethylethanolamine, which serves preferably as neutralizing agent. As neutralizing agents it is also possible, optionally, to employ inorganic bases, such as ammonia or sodium hydroxide and/or potassium hydroxide. The neutralizing agent is used mostly in a molar ratio with respect to the acid groups of the prepolymer at about 0.3:1 to 1.3:1, preferably at about 0.4:1 to 1:1.

The carboxylic acid groups can be neutralized before, during or following the urethanization reaction. The neutralizing step is preferably carried out following the urethanization reaction. It is also possible to provide the hydroxy-functional polyurethane resin B) in non-neutralized form and to carry out the neutralization not until during the preparation of the aqueous coating composition, for example when incorporating the resin into the substantially hydroxyl-free aqueous polyurethane-polyurea dispersion(s) A).

The hydroxy-functional polyester-polyurethane resins B) possess an average molecular weight $M_n$ of 1000 to 30 000, preferably 1500 to 10 000, an acid number of 10 to 80, preferably 15 to 40, and a hydroxyl group content of 0.5% to 5%, preferably 1.0% to 3.5% by weight.

The hydroxyl-functional polyester-polyurethane resins B) can be used as aqueous preparations having a solids content of 20% to 70%, preferably of 40% to 65% by weight or as a water-dilutable preparation in organic solvents, having a solids content of at least 50%, preferably at least 70% and more preferably from 75% to 90% by weight. The remainder to 100% by weight is composed of organic solvents and also, optionally, customary paint auxiliaries and additives.

As components C) it is preferred to use polyisocyanates containing free isocyanate groups. Suitable polyisocyanates are those based for example on isophorone diisocyanate, hexamethylene diisocyanate, 1,4-diisocyanatocyclohexane, bis(4-isocyanatocyclohexane)methane or 1,3-diisocyanatobenzene or based on paint polyisocyanates such as polyisocyanates containing allophanate, uretdione, biuret or isocyanurate groups and derived from 1,6-diisocyanatohexane, isophorone diisocyanate or bis(4-isocyanatocyclohexane)methane, or paint polyisocyanates containing urethane groups and based on 2,4- and/or 2,6-diisocyanatotoluene or isophorone diisocyanate on the one hand and on low molecular weight polyhydroxyl compounds such as trimethylolpropane, the isomeric propanediols or butanediols or any desired mixtures of such polyhydroxyl compounds, on the other.

Preferred components C) are hydrophobic or hydrophilicized polyisocyanates of low viscosity, containing free isocyanate groups based on aliphatic, cycloaliphatic, aralphatic and/or aromatic isocyanates; particular preference is given to aliphatic or cycloaliphatic isocyanates. These polyisocyanates have at 23° C. in general a viscosity of 10 to 3500 mPas. If necessary the polyisocyanates can be employed as a blend with small amounts of inert solvents, in order to lower the viscosity to a level within the aforesaid range. Triisocyanatononane as well can be used, alone or in mixtures, as a crosslinker component. Water-soluble and/or dispersible polyisocyanates are obtainable for example by modification with carboxylate, sulphonate and/or polyethylene oxide groups and/or polyethylene oxide/polypropylene oxide groups.

To render the polyisocyanates C) hydrophilic it is particularly preferred to react them with substoichiometric amounts of monohydric, hydrophilic polyether alcohols. The preparation of hydrophilicized polyisocyanates of this kind is described for example in EP-A 0 540 985. Likewise of particular preference are also the polyisocyanates described in EP-A 959087 that contain allophanate groups, these polyisocyanates being prepared by reacting low-monomer-content polyisocyanates with polyethylene oxide polyether alcohols under allophanatization conditions. Suitable as well are the water-dispersible polyisocyanate mixtures based on triisocyanatononane that are described in DE-A 100 078 21, and also polyisocyanates hydrophilicized with ionic groups (sulphonate groups, phosphonate groups), as described, for example, in DE-A 100 24 624. Hydrophilicization by the addition of commercially customary emulsifiers is a further possibility.

It will be appreciated that it is also possible to use component C) in the form of what are known as blocked polyisocyanates. The blocking of the abovementioned polyisocyanates having free isocyanate groups takes place in accordance with known prior art by reaction of the polyisocyanates having free isocyanate groups with suitable blocking agents. Suitable blocking agents for these polyisocyanates are, for example, monohydric alcohols such as methanol, ethanol, butanol, hexanol, cyclohexanol, benzyl alcohol, oximes such as acetoxime, methyl ethyl ketoxime, cyclohexanone oxime, lactams such as ε-caprolactom, phenols, amines such as diisopropylamine or dibutylamine, dimethylpyrazole or triazole, and dimethyl malonate, diethyl malonate or dibutyl malonate.

In order to achieve specific effects it may also be advantageous to use flexibilized polyisocyanate components C), which are easily obtained by prepolymerizing the abovementioned polyisocyanate components with preferably di- to trifunctional polyol components, more preferably difunctional polyol components as already specified under synthesis components a1).

Although the components A) and B) of the invention are generally sufficiently hydrophilic, so that the dispersibility of component C) is ensured, it is in many cases possible, by using hydrophilically modified polyisocyanates as component C), to obtain an improvement in the liquor stability and the optical and tactile properties of the soft-feel paints. It is therefore possible to use hydrophilically modified polyisocyanates as component C), preference being given in this context to polyisocyanates modified with sulphonate groups, as described for example in DE-A 100 24 624. Also possible in principle, of course, is the use of mixtures of different crosslinker resins.

Surfactants suitable as foam stabilizers D) are described for example in by K. Kosswig in K. Kosswig & H. Stache—Die Tenside—Carl Hanser Verlag 1993, page 115-177. These include, for example, the nonionic surfactants. Suitable nonionic surfactants are reaction products of aliphatic, araliphatic, cycloaliphatic or aromatic carboxylic acids, alcohols, phenol derivatives and/or amines with epoxides, such as ethylene oxide, for example. Examples thereof are reaction products of ethylene oxide with carboxylic acids of castor oil, of abietic acid, of lauric, myristic, palmitic, margaric, stearic, arachidic, behenic, lignoceric acid or unsaturated monocarboxylic acids such as oleic, linoleic, linolenic or ricinoleic acid or aromatic monocarboxylic acids such as benzoic acid, with fatty acid alkanolamides, with relatively long-chain alcohols such as oleyl alcohol, lauryl alcohol and stearyl alcohol, with phenol derivatives such as, for example, substituted benzyl-, phenylphenols, nonylphenols, fatty acid and with relatively long-chain amines such as, for example, dodecylamine and stearylamine, with fatty acid glycerides or with sorbitan esters. The reaction products of ethylene oxide are oligoethers or polyethers having degrees of polymerization of between 2 and 100, preferably between 5 and 50. The ethoxylation products of sorbitan esters of lauric, myristic, palmitic, margaric, stearic, arachidic, behenic and lignoceric acid or unsaturated monocarboxylic acids such as oleic, linoleic, linolenic or ricinoleic acid or aromatic monocarboxylic acids such as benzoic acid are particularly preferred.

Further suitable foam-stabilizing surfactants that may be mentioned include fatty acid amides, amine oxides and cationic surfactants, such as tetraalkylammonium salts and imidazolinium salts, for example. Optionally it is possible for surfactants with hydrophobic radicals that are not hydrocarbons in the wider sense to find use, such as fluorosurfactants or silicone surfactants, for example.

Preferred surfactants are anionic surfactants such as surfactants which carry carboxylate groups, such as are obtainable by saponification of natural fats and oils (soaps), examples being those in which the lipophilic radical contains 7 to 23 carbon atoms, sulphonated fats and oils, aryl- and alkylsulphonates having 8 to 24 carbon atoms such as dodecyl-, tetradecylsulphonate, alkyl ether sulphonates, alkylbenzenesulphonates, alkyl phosphates and alkyl ether phosphates. Said anionic surfactants are employed preferably in the form of their alkali metal salts and ammonium salts.

Particular preference is given to the anionic surfactants based on ammonium stearate or succinamate (Stokal® STA or SR, BGB Stockhausen, Krefeld/D).

According to field of use the preparations of the invention may comprise further additives such as thickeners, flow control assistants, matting agents, fillers, organic and inorganic pigments, hand agents, stabilizers such as hydrolysis stabilizers, UV stabilizers and absorbers, antioxidants, and stabilizers with respect to microbial degradation.

The present invention provides soft-feel foams comprising the aqueous preparations of the invention.

The foams of the invention are advantageously produced by mechanical foaming of components (A) to (D).

The composition for foaming can be prepared advantageously by simple mixing of the respective components, the respective components being used preferably directly in aqueous form, as they arise from the preparation and/or formulation, and after the substances have been mixed it is possible for the water content, where necessary, to be corrected. The foam stabilizer (D) is employed advantageously in an effective amount, which is to be chosen such that the desired stability is achieved within the desired time and in association with the desired fineness and strength of foam.

The components can be foamed in commercially customary, suitable foam frother, advantageously in one such device whose construction and operation are such that a maximally dense, uniform and fine fluidization takes place during mixing and, consequently, a correspondingly fine distribution of the air takes place and the desired fineness of foam is achieved. This is accomplished even by very simple technical means, such as high-speed stirrer mechanisms similar to a household appliance for producing whipped cream, for example. As small as possible a pressure drop on emergence from the foam beater promotes the fineness of the foam.

The foams of the invention advantageously at 20° C. under atmospheric pressure have a density in the range of 400-700 g/l, preferably in the range from 500 to 600 g/l.

The foams of the invention advantageously have a foam-cell size which is substantially smaller than 500 μm and is situated for example in the range from 0.1 to 200 μm, in particular 0.2 to 100 μm, it being possible occasionally for individual foam bubbles to have coalesced and hence to be larger, e.g. in the range from 200 to 1000 μm or else only 100 to 500 μm.

The foams of the invention are of a stability such that even after a number of hours of storage they substantially retain their foam structure and can also be flawlessly cast—optionally under a small superatmospheric pressure (for example $\leqq 0.1$ bar, e.g. 0.1 to 1 bar). Suitable foams exhibit, for example, a dynamic viscosity.

Particularly suitable for foaming the aqueous products to form the foams of the invention are mixers which are capable of generating an appropriately fine foam, especially coaxial rotor/stator mixers, in which the cylindrical inner part of the mixer head ("whisk") that is connected to the rotor is studded with radially fixedly mounted (preferably angular) pins on the cylinder wall, and the cylindrical part of the mixer head (container) that is connected to the stator is likewise studded on the inside wall with radially fixedly mounted (preferably angular) pins, so that during operation of the mixer the rotor pins mesh with the stator pins and, with the inward feed of the components and air at one end of the mixer head, there is effective foaming in the mixer head, and at the other end of the mixer head a substantially non-expanded foam emerges. Through the choice of the length, closeness and shape of the pins, in conjunction with the envisaged rotary speed, the volume of the mixer, the inward feed rate of the aqueous product and the pressure of the inward air flow, it is possible for optimum fine foaming of the products to take place, to form stable foams which are stable to spraying. Through a suitable choice of the parameters in connection with the choice of the components it is possible to generate an optimum foam under a minimal superatmospheric air pressure, e.g. with a superatmospheric pressure up to 5 bar, preferably in the range from 0.1 to 1.5 bar, more preferably 0.2 to 0.9 bar.

The aqueous foams of the invention are suitable for producing soft-feel coatings. Suitable substrates for the coatings are generally any desired usual, hard or stretchable and/or flexible substrates. Examples of hard substrates which can be mentioned include stone and stonelike materials, metal and wood. Flexible and/or tough, stretchable substrates used may be, for example, thermoplastic and/or thermoset polymers such as in the car interior or in industrial applications. Since the foams of the invention are able to give coatings having a particularly pronounced stretchability and flexibility and a particularly pronounced resilience, they are especially suitable for coatings on flexible and/or stretchable substrates and are therefore also particularly preferred for such coatings. They are preferable in particular for substrates subject to particularly exacting requirements in respect of flexibility, stretchability and resilience, examples being synthetic leathers and abovementioned polymers.

Application can take place very easily using methods that are customary per se for the application of foam, such as by knifecoating or coating with a roller, for example, or primarily by spraying with suitable spray guns that are customary per se, examples being those with or without an air supply, e.g. with so-called airless or air-mix spray guns or, preferably, with low-pressure guns (HVLP—high volume low pressure—guns). On this point it may be noted that in the spray guns with air supply the air serves essentially only for conveying the foam, and it is surprising that when the foam is conveyed in spray guns both with and without an air supply (particularly those of the aforementioned kind) the foam structure is retained during spraying to the extent that it is applied in the form of uniform foam to the substrate and can be fixed as a foam thereon. Particular suitability is possessed by application by spraying or using a roller coater. The foam can also be applied to the substrates by pouring and dipping. In a further embodiment the foam coating can also be applied to structured papers or release papers and subsequently to substrates. Furthermore, the soft-feel foam described here can also be applied by the in-mould-coating technique. In that case the surface can be given a grain via the inside of the mould.

The foam coating can also be applied to foils and subjected to three-dimensional deformation in a damage-free thermoforming operation without loss of adhesion, stress whitening or optical or tactile alteration.

The fine-pored foam coating of the invention is distinguished on account of its elastic resilience by a high energy absorption effect. Consequently it has a sound-damping and impact-damping action.

The soft-feel foams of the invention can be applied as one-coat pigmented or transparent coatings. It is also possible, furthermore, to prepare multi-layer constructions in order to obtain improved optical and tactile effects.

The foams of the invention are applied advantageously in amounts such that the application rate based on paint systems corresponds to 20 to 120 g/m$^2$, preferably 30 to 50 g/m$^2$. Based on the foam the application rate is advantageously in the range from 50 to 300, preferably 80 to 250 g/m$^2$.

The substrates provided with the foam of the invention can be dried in conventional manner—advantageously in a drying cabinet or drying tunnel.

EXAMPLES

All percentages are by weight unless indicated otherwise.

Viscosity measurements were carried out using a Physica Viscolab LC3 ISO cone-plate viscometer from Physica, Stuttgart, Germany in accordance with DIN 53019 at a shear rate of 40 s$^{-1}$.

The average particle size was determined by means of laser correlation spectroscopy (Zetasizer® 1000, Malvern Instruments, Herrenberg, Germany).

The OH numbers reported were calculated on the basis of the monomers employed.

Acid numbers: determination method, DIN ISO 3682.

Substances used and abbreviations:

BYK 348: Wetting agent (BYK-Chemie, Wesel, DE)

Tego-Wet® KL 245: Flow control additive, 50% strength in water (Tegochemie, Essen, DE)

Aquacer® 535: Wax emulsion (BYK-Chemie, Wesel, DE)

Silitin® Z 86: Filler (Hoffmann & Söhne, Neuburg, DE)

Pergopak® M 3: Filler, matting agent (Martinswerk, Bergheim, DE)

Talkum® IT extra: Matting agent (Norwegian Talc, Frankfurt, DE)

Bayferrox® 318 M: Colour pigment (black) (Bayer AG, Leverkusen, DE)

OK 412: Matting agent (Degussa, Frankfurt, DE)

Bayderm® Additive VL Thickener and flow control agent, preparation based on modified urethanes and waxes (Lanxess AG, Leverkusen, DE)

Stokal® STA Foam assistant, ammonium stearate, anionic (BGB Stockhausen, Krefeld, DE)

Stokal® SR Foam assistant, succinamate, anionic (BGB Stockhausen, Krefeld, DE)

Component A)

Example 1

Bayhydrol® PR 240 (Bayer AG, Leverkusen/D)

Polyurethane-polyurea dispersion having a solids content of 40% by weight

Example 2

Bayhydrol® LP RSC 1187 (Bayer AG, Leverkusen/D)

Polyurethane-polyurea dispersion having a solids content of 50% by weight

Component B)

Example 3

Bayhydrol® XP 2429 (Bayer AG, Leverkusen/D)

Hydroxy-functional polyester-polyurethane dispersion having a solids content of 55% by weight in water/NMP and a hydroxyl content of 0.8% by weight Component C) (PIC)

Example 4

Bayhydur® 3100 (Bayer AG, Leverkusen/D)

Hydrophilic, aliphatic polyisocyanate based on hexamethylene diisocyanate

Example 5

Production of Foam Coatings with Soft-Feel Effect

The binders (components A and B) are predispersed with water, additives, pigments, fillers and matting agents and dispersed using a bead mill. After 20-40 minutes the resultant stock varnish is filtered and the degree of gloss is adjusted with matting agent by subsequent dispersing. The viscosity is adjusted by adding water to a flow time of 25 to 90 s depending on mode of application (DIN 4 cup, AFAM 2008/10503).

The stock varnish is then admixed with stirring with the foaming and rheology additives and also with component C.

This paint system is stirred up/foamed with a stirrer/dissolver (e.g. Krups Dreimix with whisk) or with a foam-producing instrument (Micromix) until the desired foam density is achieved.

Application is made within a processing time of up to 2 h

- by spray application with a cup-type gun at 1.5 to 4 bar spraying pressure and 1 to 3 mm nozzle diameter, film thickness 50 μm to 300 μm, preferably 80 μm to 250 μm, or
- by knifecoating at 50 μm to 1000 μm, preferably 100 μm to 500 μm, or
- by pouring at 500 μm to 5000 μm, preferably 750 μm to 3000 μm.

After 10-minute evaporation at room temperature the coating is dried at 80° C. for 30 minutes.

| Example 5 | | A parts by wt. | B parts by wt. | C parts by wt. | D parts by wt. | E parts by wt. | F parts by wt. |
|---|---|---|---|---|---|---|---|
| Component I | | | | | | | |
| Example 3: Bayhydrol ® XP 2429 | | 22.9 | 24.8 | 24.3 | 23.7 | 22.7 | 21.7 |
| Example 2: Bayhydrol ® LP RSC 1187 | | 50.4 | 54.5 | 53.4 | 52.1 | 49.8 | 47.6 |
| BYK ® 348, as-supplied form | (1) | 0.7 | .0.7 | 0.7 | 0.7 | 0.7 | 0.7 |
| Tego-Wet ® KL 245, 50% strength in H$_2$O | (2) | 0.5 | 0.4 | 0.4 | 0.4 | 0.5 | 0.5 |
| Aquacer ® 535, as-supplied form | (3) | 0.6 | 0.6 | 0.6 | 0.6 | 0.6 | 0.6 |
| Silitin ® Z 86 | (4) | 1.5 | 1.4 | 1.4 | 1.5 | 1.4 | 1.5 |
| Pergopak ® M 3 | (5) | 2.2 | 2.2 | 2.1 | 2.1 | 2.2 | 2.2 |
| Talkum ® IT extra | (6) | 0.7 | 0.8 | 0.7 | 0.7 | 0.7 | 0.7 |
| Bayferrox ® 318 M | | 5.8 | 5.7 | 5.7 | 5.8 | 5.9 | 6.0 |
| Mattierungsmittel ® OK 412 | (7) | 0.6 | 0.6 | 0.6 | 0.6 | 0.6 | 0.6 |
| Stokal ® SR | (8) | 2.0 | 2.0 | 2.0 | 2.0 | 2.0 | 2.1 |
| Stokal ® STA | (8) | 0.7 | 0.7 | 0.7 | 0.7 | 0.7 | 0.7 |
| Bayderm ® Additive VL | | 1.9 | 1.8 | 1.9 | 1.9 | 1.9 | 1.9 |
| Component II* | | | | | | | |
| Example 4: Bayhydur ® 3100, 75% strength in 1-methoxy-2-propyl acetate (MPA) | | 9.5 | 3.8 | 5.5 | 7.2 | 10.3 | 13.2 |
| | | 100.0 | 100.0 | 100.0 | 100.0 | 100.0 | 100.0 |
| Technical coatings data | | | | | | | |
| NCO/OH | | 2.7 | 1.0 | 1.5 | 2.0 | 3.0 | 4.0 |
| Standing time | | 60 min. | 60 min. | 60 min. | 60 min. | 60 min. | 60 min. |
| Properties of soft-feel foam coating | | | | | | | |
| Foam density in g/ml | | 1.3-2.1 | 1.3-2.1 | 1.3-2.1 | 1.3-2.1 | 1.3-2.1 | 1.3-2.1 |
| Film thickness in μm | | 60-130 | 60-130 | 60-130 | 60-130 | 60-130 | 60-130 |
| Microhardness/rebound in % | | 74 | 78 | 76 | 75 | 70 | 66 |
| Micrometer/max. penetration depth in μm | | 13 | 15 | 14 | 14 | 12 | 12 |
| König Pendulum hardness test in s | | 35 | 30 | 32 | 34 | 39 | 40 |
| Solvent resistance (1 min. stat. exposure) | | | | | | | |

-continued

| Example 5 | A parts by wt. | B parts by wt. | C parts by wt. | D parts by wt. | E parts by wt. | F parts by wt. |
|---|---|---|---|---|---|---|
| SB/MPA/xylene/EtAc/EtOH/H2O (average) | 8 | 9 | 8 | 8 | 8 | 7 |
| Sun tan lotion resistance after 1 h at 74° C. | 3 | 3-4 | 3-4 | 3-4 | 3 | 3 |

*Bayhydur ® 3100 is prediluted with MPA and then stirred together with component 1.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Aqueous preparations having soft-feel properties and comprising
    A) aqueous polyurethane-polyurea dispersions,
    B) hydroxy-functional, aqueous or water-dilutable binders,
    C) polyisocyanates, which may have been hydrophilically modified, and
    D) foam stabilizers;
wherein component A) is prepared from:
    a1) a combination of polytetramethylene glycols and polycarbonate polyols having number average molecular weights of at least 300, containing at least two free hydroxyl groups and which are capable of reaction with isocyanate groups,
    a2) optionally, diols of the number average molecular weight range 62 to 299,
    a3) optionally, nonionic hydrophilicizer based on a copolymer of ethylene oxide and propylene oxide,
    a4) one or more di- or polyisocyanates,
    a5) one or more aliphatic and/or alicyclic primary and/or secondary polyamines, and
    a6) one or more isocyanate-reactive, ionically or potentially ionically hydrophilicizing compounds.

2. Aqueous preparations according to claim 1, wherein the aqueous polyurethane-polyurea dispersion A) has an anionic groups content of 1 to 30 mmol per 100 g of polyurethane-polyurea resin.

3. Aqueous preparations according to claim 1, wherein hydroxyl-functional polyester-polyurethane resins are used as component B).

4. Aqueous preparations according to claim 3, wherein component B) contains carboxylic acid groups as hydrophilic groups.

5. Aqueous preparations according to claim 1, wherein component B) has a number average molecular weight $M_n$ of 1000 to 30 000, an acid number of 10 to 80 and a hydroxyl group content of 0.5% to 5% by weight.

6. Aqueous preparations according to claim 1, wherein component C) is a polyether-hydrophilicized polyisocyanate.

7. Aqueous preparations according to claim 1, wherein component D) is an anionic surfactant.

8. Soft-feel foam comprising aqueous preparations according to claim 1.

9. Process for producing the soft-feel foam according to claim 8, wherein components A) to D) are foamed by means of a mechanical mixer.

10. A coating for a car interior, comprising the soft-feel foam according to claim 8.

11. Soft-feel coating consisting of soft-feel foam according to claim 8 and substrate.

12. Soft-feel coating according to claim 11, wherein the substrate is a flexible and/or stretchable substrate made of thermoplastic and/or thermoset polymers.

* * * * *